United States Patent
Ellard et al.

[11] Patent Number: 6,129,104
[45] Date of Patent: Oct. 10, 2000

[54] METHOD FOR AUTOMOTIVE DOSE CONTROL OF LIQUID TREATMENT CHEMICALS

[75] Inventors: Gregory M. Ellard, Tampa, Fla.

[73] Assignee: Tetra Process Technologies a Severn Trent Services Company

[21] Appl. No.: 09/219,946

[22] Filed: Dec. 23, 1998

[51] Int. Cl.[7] .................................................. G05D 11/13
[52] U.S. Cl. ..................................... 137/3; 137/9; 137/93
[58] Field of Search ....................................... 137/3, 9, 93

[56] References Cited

U.S. PATENT DOCUMENTS

| | | | |
|---|---|---|---|
| 3,219,046 | 11/1965 | Waugh | 137/9 |
| 3,760,829 | 9/1973 | Schuk et al. | 137/93 |
| 4,060,097 | 11/1977 | Oxford | 137/93 |
| 4,337,786 | 7/1982 | Myers et al. | 137/3 |
| 4,544,489 | 10/1985 | Campbell et al. | 210/709 |
| 4,833,622 | 5/1989 | Barto et al. | 364/496 |
| 5,284,174 | 2/1994 | Norman | 137/93 |
| 5,308,491 | 5/1994 | Hauck, Jr. et al. | 210/614 |
| 5,348,663 | 9/1994 | Miers et al. | 210/739 |
| 5,637,230 | 6/1997 | Billings | 210/739 |
| 5,779,911 | 7/1998 | Haug et al. | 210/739 |

FOREIGN PATENT DOCUMENTS

| | | | |
|---|---|---|---|
| 0071988 | 8/1982 | European Pat. Off. | B01J 19/00 |
| 0403296 | 6/1990 | European Pat. Off. | D06F 39/02 |
| 0787849 | 1/1996 | European Pat. Off. | D06F 39/02 |
| 52-93160 | 5/1977 | Japan | C02B 1/20 |

OTHER PUBLICATIONS

"Classical Feedback/Feed forward Central Applied to Methanol Dosing for Posting–Dentrification" Anjou Re Cherche, 1013N998, no date given.

Primary Examiner—Stephen M. Hepperle
Attorney, Agent, or Firm—Jo Katherine D'Ambrosio

[57] ABSTRACT

A method for controlling the addition of liquid treatment chemicals by automatic dose control. The calculation of the amount of chemical to be dosed into the system combines signals from a liquid flow meter, an influent chemical concentration analyzer and/or an effluent chemical concentration analyzer. The signals are directed to a computerized chemical dose controller that analyzes and adjusts the data from the signals and generates an output signal that controls the chemical dosing mechanisms. For example, the automatic dose control method encompasses the ability to set maximum positive and negative limits of control action as well as the ability to automatically or manually control the reset period necessary to allow previous changes to propagate through the system and be displayed at the effluent sensor thereby improving the dosing of the chemical during treatment of a liquid, wastewater for example.

33 Claims, 1 Drawing Sheet

METHOD FOR AUTOMOTIVE DOSE CONTROL OF LIQUID TREATMENT CHEMICALS

FIELD OF THE INVENTION

The present invention relates to a method for automatic dose control of liquid treatment chemicals. More specifically to a method for automatic dose control of liquid treatment chemicals used for processing liquids within a liquid treatment system.

BACKGROUND OF THE INVENTION

The control of feed chemicals used in the processing of liquids in a treatment system can be automated through the use of computerized control devices. Problems can occur during the automatic dosing of the chemical into the treatment system because of the inaccuracies of measurement of chemical present in the system and the variable ratio of chemical to liquid when the liquid flow rate is variable.

In the past, dosing was done by laboratory or bench testing the influent chemical concentration and measuring its flow. Subsequently, dose calculations were performed and the dosing device, a chemical feed pump for example, was manually adjusted according to the calculations. In later years, partial pacing of the dosing pumps was practiced using an influent water flow signal. However, it was still necessary to test the influent chemical concentration manually and fine tune the dosage rate of the pump manually. Still later, it was found that where the influent chemical concentration was reasonably stable and a process treatment plant, such as a wastewater plant, had a tight effluent standard to meet for environment permits for example. Varying the dose rate to maintain a specific effluent chemical concentration test result was a more direct approach that ensured better dosing results.

In recent years, reliable automatic analyzers for chemical concentration have become available enabling automation of the entire dosing procedure. Thus, the need for manual testing and manual adjusting has been practically eliminated. An additional consequence is that the automatic analyzers can also be set up to detect several important chemicals in water treatment making the dosing procedure useful for other applications such as the addition of sodium carbonate into an aerated biological reactor to control nitrification or the addition of iron or aluminum salts before a clarifier to control phosphorus removal.

One example of a water treatment system using automatic analyzers is found in an article presented by Nelu Puznava et al., on Oct. 3, 1998, entitled "Classical Feedback/ Feedforward Control Applied to Methanol Dosing for Post-Denitrification" (the Puznava et al reference). The Puznava et al. reference describes a feedback/feedforward control for methanol dosing for post-denitrification in an upflow floating biofilter system. The feedback and feedforward control are based on the on-line measurement of outlet and inlet nitrate concentrations, sending two signals to the control unit. Both sensors were for chemical analysis, influent nitrate and effluent nitrate concentrations.

Japanese Patent No's. Sho 52-93160 and Sho 51-130055 to Tokyo Shibaura Electric Co. (the '160 ad the '055 references) both relate to an apparatus for control of the feed rate of water purification reagents. The apparatus consists of a source water quality measurement meter for measurement of water quality of the source water intake, a reagent feed device, a ratio setting device that maintains a ratio of the reagent feed rate to the source water intake, a settling water quality measurement meter that measures the water quality of settling water and outputs a signal, and a calculating control device that receives the output signals and sets the flow rate of the reagent and sets the ratio setting device. The apparatus measures water quality factors: source water turbidity, pH, alkalinity and temperature, not concentration of the reagents.

U.S. Pat. No. 4,425,291 to Matsko (the '291 reference) discloses a system for controlling the dosing of chlorine in a system for chlorinating waste water. In the '291 reference, the chlorine dosage is controlled by electronic controllers according to a derivative of residual chlorine with respect to chlorine dosage to provide an accurate control of chlorine to insure oxidation of ammonia in waste water. Flow transmitters sense the flow of chlorine, base or sulfur dioxide to their respective tanks.

U.S. Pat. No. 4,544,489 to Campbell et al (the '489 reference) discloses a process and apparatus for the controlled addition of a conditioning polymer material to sewage sludge. The '489 reference employs a computer with a connected viscometer. Based upon the shear stresses measured and input to the computer by the viscometer, the system controls the rate of pumping of the polymer to mix with the sludge.

None of the references teach or suggest a method for automatic dose control of liquid treatment chemicals used for processing liquids within a liquid treatment system that accurately measures the correct amount of chemical required in a varied liquid flow rate system. Consequently, there remains a need for accuracy in the method for measuring chemicals in both the influent flow and the effluent flow of a variable flow system. Further, there is a need for a method for automatic dose control of liquid treatment chemicals with enhanced control to improve the chemical dosing during water treatment.

SUMMARY OF THE INVENTION

The new and improved method for controlling the addition of liquid treatment chemicals using an automatic dose control system comprises a combination of signals from a liquid flow meter, an influent chemical concentration analyzer and/or an effluent chemical concentration analyzer. Preferably, these signals are directed to a computerized chemical dose controller that controls the chemical dosing pumps. The liquid being treated within the chemical system can comprise wastewater treated with a chemical that is a source of carbon. A carbon source is often added to denitrification reactors to encourage denitrification.

In one preferred method for automatic dose control of water treatment chemicals, the flow meter is an influent flow meter and the chemical concentration analyzer is an effluent analyzer or a combination of influent and effluent concentration analyzers. The combination of liquid flow data and chemical concentration analysis as the basis for controlling the dosing enhances and improves chemical dosing during water treatment.

A preferred method for automatic dose control of a liquid treatment chemical during a liquid treatment process within a treatment system, the system having an influent flow and an effluent flow, comprises:

a. measuring the liquid flow rate through the treatment system and generating a liquid flow rate signal from the measurement;

b. measuring the concentration of a chemical within the treatment system and generating a chemical concentration signal from the measurement;

c. transmitting the signal generated from step (a) and the signal generated from step (b) to a chemical dosing controller;

d. automatically calculating the dosage of a chemical from signals supplied to the chemical dosing controller;

e. transmitting an output signal from the chemical dosing controller to a chemical feeding system, the output signal based on dosage calculated in step (d);

f. releasing the chemical from step d into influent flow in response to output signal of step (e); and g. repeating steps (a)–(f) continuously during the liquid treatment process.

In this preferred method, the liquid flow rate is measured in the influent flow of the system. Alternately, the liquid flow rate is measured in the effluent flow of the system. Preferably, the liquid flow rate is adjusted by a flow pace multiplier. The concentration of the chemical in step (b) can be measured in the influent flow of the system. Alternatively, the concentration of the chemical in step (b) is measured in the effluent flow of the system. In still another alternative, the concentration of the chemical in step (b) is measured both in the effluent flow and in the influent flow of the system. In one aspect of this invention, the chemical in step (b) is the same chemical as in step (d). Alternatively, the chemical in step (b) is a different chemical from the chemical in step (d).

Preferably, the measurement of the liquid flow rate in step (a) and the concentration of the chemical in step (b) is performed continuously. Alternatively, The measurement of the liquid flow rate in step (a) is continuous and the measurement of the concentration of the chemical in step (b) is performed at intervals within a range of from a fraction of a second to approximately 15 minute intervals.

In one preferred embodiment, the liquid of the liquid treatment process is water and the treatment process is a water treatment process.

In one preferred method for automatic dose control within a denitrification treatment system having an influent flow and an effluent flow, the chemical being controlled is nitrate-nitrogen during a water treatment process and a chemical source of organic carbon is the feed chemical. The preferred method comprises:

a. measuring the water flow rate through the treatment system and generating a water flow rate signal from the measurement;

b. measuring the concentration of nitrate-nitrogen within the influent flow of the treatment system and generating a chemical concentration signal from the measurement;

c. transmitting the signal generated from step (a) and the signal generated from step (b) to a chemical dosing controller;

d. automatically adjusting the nitrate/nitrogen signal by at least one adjustable dose factor;

e. automatically calculating the dosage of the feed chemical from adjusted signals supplied to chemical dosing controller;

f. transmitting an output signal from the chemical dosing controller to a chemical feeding system, the output signal based on dosage calculated in step (e);

g. releasing the feed chemical into the influent flow in response to the output signal of step (f); and h. repeating steps (a)–(g) continuously during the denitrification process.

In this preferred method, the feed chemical is selected from the group consisting of alcohol and volatile fatty acid.

Preferably, the feed chemical is methanol. In one aspect, the water flow rate signal of step (c) is automatically adjusted by a flow pace multiplier. In another aspect, the concentration of the nitrate-nitrogen is measured both at the effluent flow and at the influent flow of the system. Preferably, a setpoint for effluent nitrate-nitrogen is selected, an effluent flow concentration signal is generated from the measurement of concentration of nitrate-nitrogen in the effluent flow and the concentration signal is transmitted to the chemical dosing controller.

In one embodiment, the difference between the effluent concentration of nitrate-nitrogen and the setpoint is calculated to generate a control response, the control response is adjusted by one or more sensitivity factors and the adjusted control response is automatically incorporated into the calculation for the dosage of the feed chemical. Preferably, the dosage is used to generate a modified output signal which is transmitted from the chemical dosing controller to the chemical feeding system. Alternatively, the modified output signal from the chemical dosing controller to the chemical feeding system is transmitted after a reset time. In one preferred embodiment, the reset time is input manually. Alternatively, the reset time is an automatically calculated variable based on the hydraulic residence time through the process and the process reaction time. The nitrate-nitrogen signal can be automatically adjusted by at least one adjustable dose factor.

In an alternative method for automatic dose control of nitrate-nitrogen during a water treatment process within a denitrification treatment system using a chemical source of organic carbon as the feed chemical, the system having an influent flow and an effluent flow, the method comprising:

a. selecting a setpoint for effluent nitrate-nitrogen;

b. measuring the water flow rate through the treatment system and generating a water flow rate signal from the measurement;

c. measuring the concentration of nitrate-nitrogen in the effluent flow and generating a chemical concentration signal from the measurement;

d. transmitting the signal generated from step (b) and the signal generated from step (c) to a chemical dosing controller;

e. calculating the difference between the effluent concentration of nitrate-nitrogen and the setpoint to generate a control response;

f. adjusting the control response by one or more sensitivity factors;

g. automatically calculating the dosage of the feed chemical from the control response;

h. transmitting output signal from chemical dosing controller to the chemical feeding system, the output signal based on dosage calculated in step (g);

i. releasing the feed chemical into influent flow in response to output signal of step (h); and j. repeating steps (a)–(i) continuously during the denitrification process.

Preferably, the concentration of nitrate-nitrogen is measured in both the influent flow and the effluent flow. In one aspect, the concentration of the of nitrate-nitrogen in the influent flow is measured and an influent flow concentration signal is generated and transmitted to the chemical dosing controller. Preferably, the influent flow concentration signal is adjusted by an adjustable dose factor and the water flow rate signal from step (d) is adjusted by a flow pace multiplier.

In a preferred embodiment, the calculation of an output signal from the chemical dosing controller to the chemical feeding system is based on water flow rate, concentration of nitrate-nitrogen in the influent flow and concentration of nitrate-nitrogen in the effluent flow. Preferably, the calculation of succeeding control responses in step (e) is performed after a reset time. The reset time can be input manually, or alternatively, the reset time can be an automatically calculated variable based on the hydraulic residence time through the process and the process reaction time.

A derivative control response is preferably generated to counteract rapid rates of change towards or away from the setpoint. The preferred derivative control response is generated by determining a first effluent concentration prior to the reset time, a second effluent concentration is measured at the reset time, comparing the first effluent concentration to the second effluent concentration and adjusting the control response accordingly.

In an alternative embodiment of a method for automatic dose control of a liquid treatment chemical during a treatment process within a liquid treatment system using a feed chemical, the system having an influent flow and an effluent flow, the method comprises:

a. selecting a setpoint for a chemical in the effluent flow;
b. measuring the liquid flow rate through the treatment system and generating a liquid flow rate signal from the measurement;
c. measuring the concentration of the chemical of step (a) in the influent flow and generating an influent chemical concentration signal from the measurement;
d. measuring the concentration of the chemical of step (a) in the effluent flow and generating an effluent chemical concentration signal from the measurement;
e. transmitting the signal generated from step (b) to a chemical dosing controller and generating a primary control response;
f. adjusting the primary control response by a flow pace multiplier;
g. transmitting the signal generated from step (c) to a chemical dosing controller and generating a secondary control response;
h. adjusting the secondary control response by an adjustable dose factor;
i. transmitting the signal from step (d) to the chemical dosing controller and calculating the difference between the effluent chemical concentration and the setpoint to generate a tertiary control response;
j. adjusting the tertiary control response by one or more sensitivity factors;
k. continuously calculating the dosage of the feed chemical from the primary control response and secondary control response while incorporating the tertiary control response from step (f) after a reset period;
l. transmitting an output signal from chemical dosing controller to a chemical feeding system, the output signal based on dosage calculated in step (k);
m. releasing a feed chemical into influent flow in response to output signal of step (l); and
n. repeating steps (a)–(m) continuously during the treatment process. Preferably the chemical in step (a) is the same chemical as in step (m). In one aspect, the chemical in step (a) is a different chemical from the chemical in step (m).38. In one embodiment, the reset time is input manually. Alternatively, the reset time is an automatically calculated variable based on the hydraulic residence time through the process and the process reaction time.

DETAILED DESCRIPTION OF THE INVENTION

Figure 1:
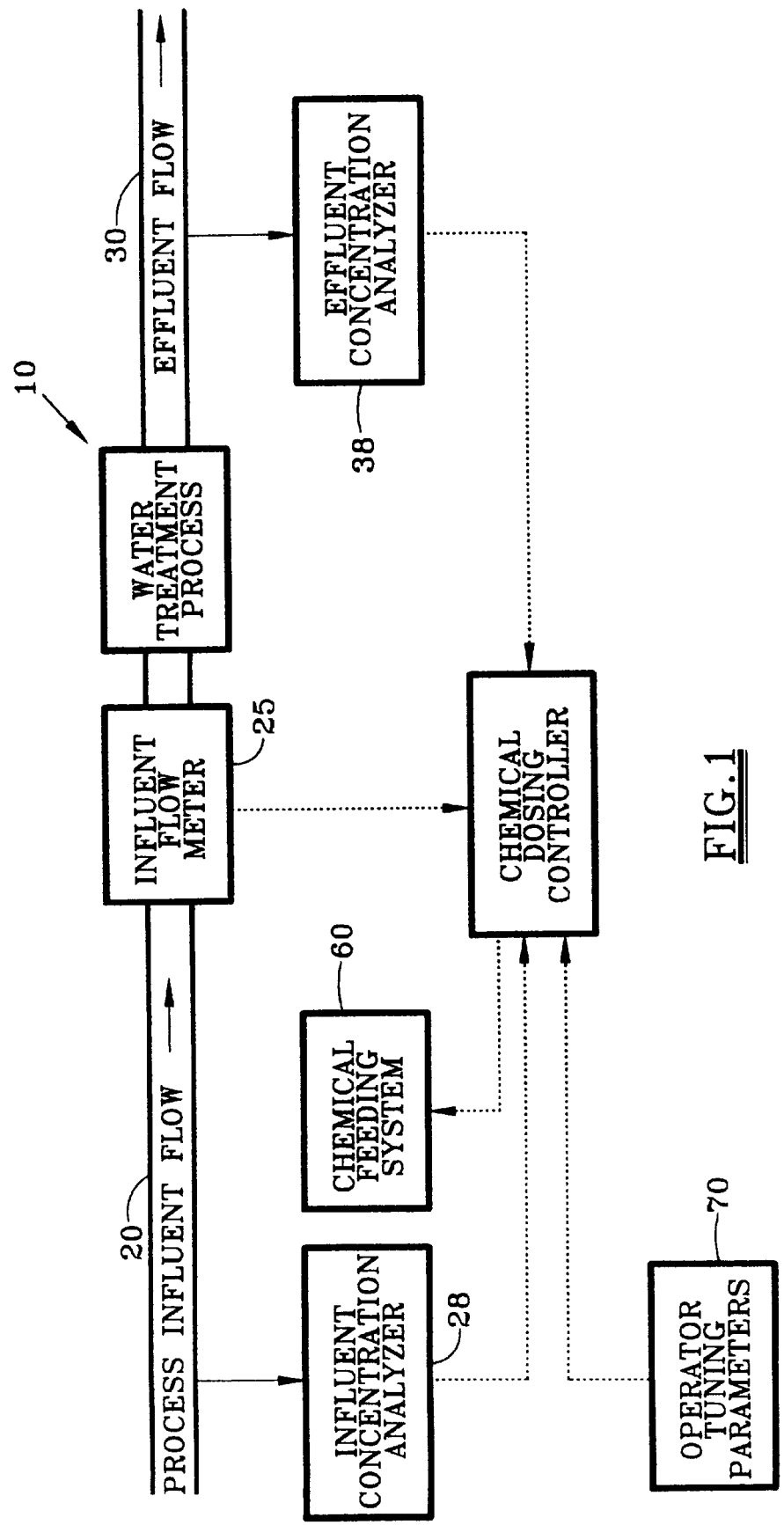
FIG. 1 is a schematic of a method for automatic dose control of liquid treatment chemicals according to the present invention.

In the new and improved method for controlling the addition of liquid treatment chemicals by automatic dose control, calculation of the amount of chemical to be dosed into the system combines signals from a liquid flow meter, an influent chemical concentration analyzer and/or an effluent chemical concentration analyzer. Preferably, these signals are directed to a computerized chemical dose controller that analyzes and adjusts the data from the signals and outputs a signal that controls the chemical dosing equipment. The method of this invention accomplishes automatic dose control with enhanced control to improve the chemical dosing during the treatment process. For example, the automatic dose control method encompasses the ability to set maximum positive and negative limits of control action, and the ability to automatically or manually control the reset period necessary to allow previous changes to propagate through the system and be displayed at the effluent sensor thereby improving the dosing of the chemical during water treatment.

Liquid treatment systems using automatic dose control include denitrification of wastewater treatment systems, addition of sodium carbonate or bicarbonate for biological aeration, and the addition of alum or iron salts in a process designed to remove phosphates.

Referring to the schematic of FIG. 1, a liquid or wastewater treatment system utilizing a chemical process in the treatment of the wastewater comprises a process influent flow 20, and effluent flow 30, a computerized control system referred to as a chemical dosing controller 50 which produces a signal to a variable capacity chemical dosing or feeding system 60, a chemical feed pump 60 for example that doses the treatment system with the appropriate chemical. Preferably, the chemical feed pump 60 comprises an automatically variable output through pump speed changes and/or pump stroke length changes. The pump is activated by the signal from the chemical dosing controller 50 based on the input of two or three variables, the process water flow rate, influent chemical concentration, and, in an alternative method, the input of effluent chemical concentration.

The first variable, the process water flow rate, is measured by an electronic flow meter 25. The flow meter is preferably positioned either in the influent flow 20, or alternatively, it can be positioned in the effluent flow 30. The flow meter 25 measures the water flow rate through the treatment system 10 and generates a water flow rate signal from the measurement. If the flow meter is in the effluent flow, the reading will have a time lag due to detention time in the process plant piping and tankage. This time lag can be accounted for in the chemical dosing controller 50 by the system operator.

Preferably, the controller 50 generates a primary control response based on the water flow rate signal. The controller 50 automatically adjusts the primary control response from either an influent flow meter or an effluent flow meter by a flow pace multiplier. This adjustment or any adjustment of control responses can be performed manually by an operator but automatic adjustments previously programmed into the controller 50 are preferred. The adjusted primary control response, or process flow factor, can be transmitted as a dosing signal to the chemical feeding system. These measurement and signals are produced continuously, as often as approximately 0.5 second up to about every 5 minutes. Alternatively, the adjusted primary control response can be combined with secondary and/or tertiary control responses to produce a dosing signal. Maximum output of the chemical feeding system 60 varies with the water flow rate through the water treatment system 10. Calculation of the primary control response is represented as follows:

primary control response=flow pace multiplier×flow rate÷flowmeter maximum span

The concentration of chemical in the influent flow is the second variable in determining the chemical dosage. A chemical analyzer 28 is used to measure the chemical concentration in the influent flow and generate a signal that is transmitted to the chemical dosing controller 50. Chemical analyzers for measuring chemical concentration are well known in the art and will not be further describe herein. The chemical dosing controller 50 generates a secondary control response based on the chemical signal from the chemical. The secondary control response is adjusted by an adjustable dose factor. The adjustable dosing factor is determined by the operator to allow for differences in process efficiency. Standard dose factors, known in the art, can also be used to adjust the secondary control response. The standard dose factor is the empirical or normally required ratio between the chemical added and the chemical it reacts with; standard factors are known in the art. When using methanol to remove nitrate-nitrogen, the standard dose factor is about 3.0.

Calculation of the secondary control response is represented as follows:

secondary control response=(adjustable dose factor×measured influent concentration)÷(standard dose factor×maximum influent concentration)

The output or dosing signal from the chemical dosing controller 50 to the feed pump 60 is then modified by the adjusted secondary control response. Calculation of a dosing signal at this step in the method of automatic dose control is represented as follows:

dosing signal=adjusted primary control response×adjusted secondary response

The measurements of influent chemical concentration and generation of signals for the adjusted primary and secondary response controls can occur in intervals from less than a second to approximately 15 minutes.

The third variable in calculating chemical dosage comprises the effluent flow chemical concentration. Measurement of the effluent flow chemical concentration and transmission of a signal based on this measurement to the chemical dosing controller 50 generates a tertiary control response. Combining this variable with either the primary control response or the secondary control response or both is preferable in order to adjust for varying levels of process efficiency or to control to a setpoint to ensure a specific effluent chemical concentration result. The effluent chemical concentration is measured by an effluent concentration analyzer 38 which generates a signal that is transmitted to the chemical dosing controller 50. The chemical dosing controller 50 generates a tertiary control response based on the chemical signal from the chemical analyzer 38. The tertiary control response is based on effluent concentration. The tertiary control response is a more complex calculation. Tertiary control response controls to a selected effluent concentration setpoint. A significant feature of this control method is that it takes into consideration the possibility of a large passage of time, lag time, between making a control change in chemical dosage upstream in the process and waiting for the result to react in the process, and propagate through pipes and tankage to the point where the effluent concentration result is measured. Most commercially available controllers are designed to operate continuously, which gives control problems when there is lag time.

In the method of this invention the control system operates continuously using the adjusted primary and secondary control responses explained above to generate chemical dosing signals, but only at discrete intervals to generate a tertiary control response. These intervals are known as the reset time. The reset time may be set manually to a specific and unchanging interval, or automatically. When the reset time is calculated automatically, the next reset interval is based on the present process flow rate, the known volume of pipes and tankage between the control point and measuring point, and an experience-based adjustable period of time for the process itself to react to the control change. Calculation of the secondary control response is based on the hydraulic residence time through the process and the process reaction time and can be represented as follows:

Reset Time=(Process tankage volume÷Process flow rate)+Process reaction time

When this interval has timed out, the effluent concentration factor is recalculated and the tertiary control response is combined with the primary and secondary control responses to generate a chemical dosage output signal. Preferably, the dosage of feed chemical based on the adjusted primary control response and the adjusted secondary control response is calculated and transmitted continuously while the adjusted tertiary control response is incorporated into the calculations after the reset time. The measurements of influent chemical concentration and generation of signals for the adjusted primary and secondary response can occur in intervals within a range of from less than one second to approximately 15 minutes. The time of reset interval is within a range of from about 5 minutes to about 120 minutes, or even as long as three to four hours in very large treatment systems. In one preferred method the reset time is from about 30 minutes to about 60 minutes. After the reset time expires, a new reset interval is calculated using the process flow at that time and the cycle begins again.

Tertiary control response is based on effluent chemical concentration. When tertiary control is first initiated, it starts out as a neutral factor, one (1) for example, that neither decreases or increases existing control responses. Changes to the tertiary control response are calculated by comparing the measured effluent concentration to a setpoint that the plant operator has established and uses as a control. The change to the tertiary control response l known in the art as a "step change". The setpoint is entered into the chemical dosing controller and used to calculate the tertiary control response. This calculation is performed when the reset period described above elapses. The setpoint is subtracted from the effluent concentration to determine the "error" and multiplied by a sensitivity factor. The sensitivity factor is selected by the operator based on the operator's experience with the specific liquid treatment process requiring dosing. The sensitivity factor can have two values. One of the sensitivity factor values is designated for use when the effluent concentration is above setpoint. The other is used when the effluent concentration is below setpoint. The step change equation can be represented as follows:

$$\text{step change} = \frac{\text{sensitivity factor} \times (\text{effluent concentration} - \text{setpoint})}{100}$$

The step change calculation is positive when the effluent concentration is above setpoint, causing the tertiary control response to increase in size for the next reset period and speed up the chemical feeding system, preferably, a dosing pump 60. The step change is negative when the effluent concentration is below setpoint, reducing the tertiary control response and trimming the dose.

When an adjusted tertiary control response is calculated, the adjusted tertiary control response can be incorporated into the equation used to calculate the dosing output signal after the reset period. If this were applied to the dosing signal equation, the complete equation including tertiary control response is represented as follows:

Dosing Signal=adjusted primary control response×adjusted secondary response×adjusted tertiary control response After the dosing signal is automatically calculated by the chemical dosing controller 50, the signal is transmitted to the chemical feeding system 60 or pump which doses the treatment system with the amount of feed chemical indicated. The feed chemical is preferably dosed into the influent flow 20.

In the practice of the method, the process variable may approach or leave the setpoint at a high rate just before the next tertiary control response is calculated. Rather than making the next step change in chemical dosing based solely on the final effluent concentration under these conditions, it would be helpful to modify the next tertiary control response to counteract the rate of change trend, the modified tertiary control response is referred to as a derivitive control response. In the practice of the method of this invention, the derivative control response is generated by measuring the effluent concentration at an adjustable time period before the reset period ends and comparing it to the effluent concentration at the end of the reset period. If the rate of change in the effluent concentration is fast, the next step change in chemical dosage is factored up or down accordingly. The rate of change and the response factor will differ for each installation. The factor used will also depend on whether the effluent concentration is above or below setpoint at the end of reset. Example: Check effluent concentration, EC, trend 15 minutes from end of reset, R, and then at R as well. Assume that 0.3 mg/L change in either direction is considered a fast rate of change for this process. Increase or decrease calculated step change by a factor of 25% to counteract the direction of change. A representative equation is as follows:

If $EC_R > SP$ and $EC_R - EC_{R-15} > 0.3$ then $SC_{NEW} = 1.25 \times SC_{CALC}$ or $EC_R - EC_{R-15} \leq -0.3$ then $SC_{NEW} = 0.75 \times SC_{CALC}$ If $EC_R < SP$ and $EC_R - EC_{R-15} > 0.3$ then $SC_{NEW} = 0.75 \times SC_{CALC}$ or $EC_R - EC_{R-16} \leq -0.3$ then $SC_{NEW} = 1.25 \times SC_{CALC}$ Where EC is effluent chemical concentration, R is reset, SP is the setpoint and SC is the step change as calculated according to the equation described above. The factor, 1.25 represents an increase of 25% and the factor 0.75 represents a decrease of 25%. These factors are adjusted by the operator based on experience with the specific liquid treatment process.

When tertiary control is initiated, the tertiary control response starts out at 1.0. At the end of the reset time, the Step Change calculation is made and the result added to the present effluent concentration. This repeats at the end of each reset period:

$$EC_{NEW} = EC_{NOW} + SC_{NEW}$$

During the practice of this method, steps are taken to keep control inputs and outputs within a reasonable range. To preclude the tertiary control response from ramping out of control, operator-adjustable upper and lower limits for the tertiary control action are programmed into the chemical dosing controller. The effluent concentration will not be allowed to exceed these limits. The sensitivity factors can also have adjustable upper limits. During one preferred method, minimum and maximum allowable signal to the dosing pump can be set up. Since the reset time can be set manually or automatically, minimum and maximum reset time limits can be set up for each.

Preferably, the control system can allow for control modes using manual control, flow control, flow plus influent concentration, flow plus effluent concentration, or flow plus influent and effluent concentration. This allows for different equipment configurations as well as maintenance on various parts of the system. A list of the some of the possible control variables used during the practice of this method are as follows:

| Control Variables | |
|---|---|
| Externally Set (MMI) | Internally set (PLC) |
| Adjustably dose factor | Standard dose factor |
| Flow pace multiplier | Max influent concentration |
| Process tankage | Flowmeter span |
| Process reaction time | Max sensitivity factor above SP |
| Sensitivity factor above | Max sensitivity factor below SP |
| Setpoint (SP) | Max reset time |
| +Fast rate of change above SP | Min reset time |
| −Fast rate of change above SP | |
| +Fast rate of change below SP | |
| −Fast rate of change below SP | |
| Rate of change factor toward SP | |
| Rate of change factor leaving SP | |
| Min Effluent Concetration (EC) | |
| Max EC | |
| Max dosing signal | |
| Min dosing signal | |
| Reset time auto/manual mode | |
| Manual reset time | |
| Manual dosing signal | |
| Auto/manual control mode | |
| Flow control mode | |
| Flow + inf conc control mode | |
| Flow + eff conc control mode | |
| Flow + inf + eff conc control mode | |

In one preferred method of this invention, the liquid treatment system described will be a wastewater treatment system and the process, a denitrification process using a source of organic carbon as the chemical to be dosed into the wastewater flow. However the method of this invention is applicable to any liquid treatment system that requires automatic dosing of a treatment chemical, such as the systems described above, and not limited to wastewater treatment systems.

Denitrification is a biochemical conversion of aqueous nitrate-nitrogen and nitrite-nitrogen to nitrogen gas. The denitrification reactor can assume many forms including upflow or downflow granular filters or packed beds, as well as stirred tanks or rotating biological contractors. A chemical source for organic carbon is used in the denitrification process. The carbon source is typically an alcohol or an organic acid, such as a volatile fatty acid. One preferred alcohol is methanol, alternatively, acetic acid can be the source chemical. Preferably, the wastewater treatment system comprises an influent flow 20 and an effluent flow 30. In the denitrification process, the dosing of the feed chemical, methanol, for example, is calculated from the nitrate-nitrogen concentration within the wastewater flow. The concentration of nitrate-nitrogen can be calculated in the influent flow 20 or the effluent flow 30, or both. During the practice of this method in a denitrification process, the water flow rate through the treatment system is measured and a signal based on that method generated and transmitted to a chemical dosing controller 50 as a primary control response. The primary control response can be adjusted by a flow pace multiplier. The concentration of nitrate-nitrogen is then measured in the influent flow 20 and a signal generated and transmitted to the chemical dosing controller 50 as the secondary control response. The secondary control response can be automatically modified by one or more adjustable dose factors. Standard dose factors and other operator adjustable dose factors are used so that an operator can modify the secondary control response based on his experience with the liquid treatment system being dosed. In one method of practicing this invention, the adjusted primary control response and the adjusted secondary control response are combined to generate a chemical dosing output signal that is transmitted from the chemical dosing controller 50 to the chemical feeding system 60. The chemical feeding system 60 feeds methanol in an amount based on the chemical dosing output signal.

Alternatively, the nitrate-nitrogen concentration can also be measured in the effluent flow 30. The tertiary control response based on effluent concentration is calculated by comparing the measured effluent concentration to a setpoint that the plant operator has established and uses as a control. The setpoint is entered into the chemical dosing controller and used to calculate the tertiary control response. This calculation is performed when the reset period described above elapses. The setpoint is subtracted from the effluent concentration to determine the "error" and multiplied by a sensitivity factor to generate an adjusted tertiary control response. When an adjusted tertiary control response is calculated, the adjusted tertiary control response can be incorporated into the equation used to calculate the dosing output signal after the reset period has expired. If this were applied to the dosing signal equation, the complete equation including tertiary control response is represented as follows:

Dosing Signal=adjusted primary control response×adjusted secondary response×adjusted tertiary control response The dosing signal is then transmitted to the chemical feeding system 60 to feed the necessary amount of methanol into the influent flow 20.

Field trials of the chemical dosing control system of the present invention have shown a reduced tendency to overfeed or underfeed the treatment chemicals and a stabilized effluent chemical concentration. The improved method has allowed: (1) Operating the treatment system to a greater degree of conversion or a lower effluent chemical concentration than was possible before this invention, without the risk of overfeeding treatment chemical. (2) Operating the treatment system to a lower degree of conversation or a higher effluent chemical concentration using less treatment chemical, while still meeting effluent targets or environmental permits.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

What is claimed is:

1. A method for automatic dose control of a liquid treatment chemical during a liquid treatment process within a treatment system, the system having an influent flow and an effluent flow, the method comprising:
   a. measuring the liquid flow rate at a site wherein the site is selected from any one of a group of sites consisting of an influent flow site, an effluent flow site or a combination thereof, and generating a liquid flow rate signal from the measurement;
   b. measuring the concentration of a chemical at a site wherein the site is an influent flow site, an effluent flow site or a combination thereof, and generating a chemical concentration signal from the measurement;
   c. transmitting the signal generated from step (a) and the signal generated from step (b) to a chemical dosing controller;
   d. automatically calculating the dosage of a chemical from signals supplied to the chemical dosing controller;
   e. transmitting an output signal from the chemical dosing controller to a chemical feeding system, the output signal based on dosage calculated in step (d);
   f. releasing the chemical from step d into influent flow in response to output signal of step (e); and
   g. repeating steps (a)–(f) continuously during the liquid treatment process.

2. A method for automatic dose control of a liquid treatment chemical during a liquid treatment process within a treatment system, the system having an influent flow and an effluent flow, the method comprising:
   a. measuring the liquid flow rate through the treatment system and generating a liquid flow rate signal from the measurement and adjusting the liquid flow rate signal by a flow pace multiplier;
   b. measuring the concentration of a chemical through the treatment system and generating a chemical concentration signal from the measurement;
   c. transmitting the signal generated from step (a) and the signal generated from step (b) to a chemical dosing controller;
   d. automatically calculating the dosage of a chemical from signals supplied to the chemical dosing controller;
   e. transmitting an output signal from the chemical dosing controller to a chemical feeding system, the output signal based on dosage calculated in step (d);
   f. releasing the chemical from step d into influent flow in response to output signal of step (e); and
   g. repeating steps (a)–(f) continuously during the liquid treatment process.

3. The method of claim 1 wherein the chemical in step (b) is the same chemical as in step (d).

4. The method of claim 1 wherein the chemical in step (b) is a different chemical from the chemical in step (d).

5. The method of claim 1 wherein the measurement of the liquid flow rate in step (a) and the concentration of the chemical in step (b) is performed continuously.

6. The method of claim 1 wherein the measurement of the liquid flow rate in step (a) is continuous and the measurement of the concentration of the chemical in step (b) is performed at intervals within a range of from a fraction of a second to approximately 15 minute intervals.

7. The method of claim 1 wherein the liquid of the liquid treatment process is water and the treatment process is a water treatment process.

8. A method for automatic dose control of nitrate-nitrogen during a water treatment process within a denitrification treatment system using a chemical source of organic carbon as the feed chemical, the system having an influent flow and an effluent flow, the method comprising:

a. measuring the water flow rate at a site wherein the site is selected from any one of a group of sites consisting of an influent flow site, an effluent flow site or a combination thereof and generating a water flow rate signal from the measurement;

b. measuring the concentration of a chemical at a site wherein the site is an influent flow site, an effluent flow site or a combination thereof, and generating a chemical concentration signal from the measurement;

c. transmitting the signal generated from step (a) and the signal generated from step (b) to a chemical dosing controller;

d. automatically adjusting the nitrate/nitrogen signal by at least one adjustable dose factor;

e. automatically calculating the dosage of the feed chemical from adjusted signals supplied to chemical dosing controller;

f. transmitting an output signal from the chemical dosing controller to a chemical feeding system, the output signal based on dosage calculated in step (e);

g. releasing the feed chemical into the influent flow in response to the output signal of step (f); and h. repeating steps (a)–(g) continuously during the denitrification process.

9. The method of claim 8 wherein the feed chemical is selected from the group consisting of alcohol and volatile fatty acid.

10. The method of claim 9 wherein the feed chemical is methanol.

11. A method for automatic dose control of nitrate-nitrogen during a water treatment process within a denitrification treatment system using a chemical source of organic carbon as the feed chemical, the system having an influent flow and an effluent flow, the method comprising:

a. measuring the water flow rate at a site wherein the site is an influent flow site, an effluent flow site or a combination thereof and generating a water flow rate signal from the measurement;

b. measuring the concentration of a chemical at a site wherein the site is selected from any one of a group of sites consisting of an influent flow site, an effluent flow site or a combination thereof, and generating a chemical concentration signal from the measurement;

c. transmitting the signal generated from step (a) and the signal generated from step (b) to a chemical dosing controller wherein the water flow rate signal of step (a) is automatically adjusted by a flow pace multiplier;

d. automatically adjusting the nitrate/nitrogen signal by at least one adjustable dose factor;

e. automatically calculating the dosage of the feed chemical from adjusted signals supplied to chemical dosing controller;

f. transmitting an output signal from the chemical dosing controller to a chemical feeding system, the output signal based on dosage calculated in step (e);

g. releasing the feed chemical into the influent flow in response to the output signal of step (f); and h. repeating steps (a)–(g) continuously during the denitrification process.

12. The method of claim 8 wherein a setpoint for effluent nitrate-nitrogen is selected, an effluent flow concentration signal is generated from the measurement of concentration of nitrate-nitrogen in the effluent flow and the concentration signal is transmitted to the chemical dosing controller.

13. The method of claim 12 wherein the difference between the effluent concentration of nitrate-nitrogen and the setpoint is calculated to generate a control response, the control response is adjusted by one or more sensitivity factors and the adjusted control response is automatically incorporated into the calculation for the dosage of the feed chemical.

14. A method for automatic dose control of nitrate-nitrogen during a water treatment process within a denitrification treatment system using a chemical source of organic carbon as the feed chemical, the system having an influent flow and an effluent flow, the method comprising:

a. measuring the water flow rate through the treatment system and generating a water flow rate signal from the measurement;

b. measuring the concentration of a chemical at a site wherein the site is an effluent flow site, selecting a setpoint for effluent nitrate-nitrogen and generating an effluent flow concentration signal from the measurement of concentration of nitrate-nitrogen in the effluent flow;

c. transmitting the signal generated from step (a) and the signal generated from step (b) to a chemical dosing controller;

d. calculating the difference between the effluent concentration of nitrate-nitrogen and the setpoint to generate a control response, adjusting the control response by one or more sensitivity factors and automatically incorporating the adjusted control response into the calculation for the dosage of the feed chemical wherein the dosage is used to generate a modified output sign which is transmitted from the chemical dosing controller to the chemical feeding system;

e. releasing the feed chemical into the influent flow in response to the output signal of step (f): and h. repeating steps (a)–(e) continuously during the denitrification process.

15. The method of claim 14 wherein the modified output signal from the chemical dosing controller to the chemical feeding system is transmitted after a reset time.

16. The method of claim 15 wherein the reset time is input manually.

17. The method of claim 15 wherein the reset time is an automatically calculated variable based on the hydraulic residence time through the process and the process reaction time.

18. The method of claim 14 wherein the nitrate-nitrogen signal is automatically adjusted by at least one adjustable dose factor.

19. A method for automatic dose control of nitrate-nitrogen during a water treatment process within a denitrification treatment system using a chemical source of organic carbon as the feed chemical, the system having an influent flow and an effluent flow, the method comprising:

a. selecting a setpoint for effluent nitrate-nitrogen;

b. measuring the water flow rate at an effluent flow site, and generating a water flow rate signal from the measurement;

c. measuring the concentration of nitrate-nitrogen in the effluent flow and generating a chemical concentration signal from the measurement;

d. transmitting the signal generated from step (b) and the signal generated from step (c) to a chemical dosing controller;

e. calculating the difference between the effluent concentration of nitrate-nitrogen and the setpoint to generate a control response;

f. adjusting the control response by one or more sensitivity factors;

g. automatically calculating the dosage of the feed chemical from the control response;

h. transmitting output signal from chemical dosing controller to the chemical feeding system, the output signal based on dosage calculated in step (g);

i. releasing the feed chemical into influent flow in response to output signal of step (h); and j. repeating steps (a)–(i) continuously during the denitrification process.

20. The method of claim 19 wherein the concentration of nitrate-nitrogen is measured in both the influent flow and the effluent flow.

21. The method of claim 20 wherein the concentration of the of nitrate-nitrogen in the influent flow is measured and an influent flow concentration signal is generated and transmitted to the chemical dosing controller.

22. A method for automatic dose control of nitrate-nitrogen during a water treatment process within a denitrification treatment system using a chemical source of organic carbon as the feed chemical, the system having an influent flow and an effluent flow, the method comprising:

a. selecting a setpoint for effluent nitrate-nitrogen;

b. measuring the water flow rate through the treatment system and generating a water flow rate signal from the measurement, wherein the water flow rate signal is adjusted by a flow pace multiplier;

c. measuring the concentration of nitrate-nitrogen at an effluent flow site and generating a chemical concentration signal from the measurement;

d. transmitting the signal generated from step (b) and the signal generated from step (c) to a chemical dosing controller;

e. calculating the difference between the effluent concentration of nitrate-nitrogen and the setpoint to generate a control response;

f. adjusting the control response by one or more sensitivity factors;

g. automatically calculating the dosage of the feed chemical from the control response;

h. transmitting output signal from chemical dosing controller to the chemical feeding system, the output signal based on dosage calculated in step (g);

i. releasing the feed chemical into influent flow in response to output signal of step (h); and j. repeating steps (a)–(i) continuously during the denitrification process.

23. The method of claim 22 wherein the calculation of a n output signal from the chemical dosing controller to the chemical feeding system is based on water flow rate, concentration of nitrate-nitrogen in the influent flow and concentration of nitrate-nitrogen in the effluent flow.

24. The method of claim 22 wherein the calculation of succeeding control responses in step (e) is performed after a reset time.

25. The method of claim 24 wherein the reset time is input manually.

26. The method of claim 24 wherein the reset time is an automatically calculated variable based on the hydraulic residence time through the process and the process reaction time.

27. The method of claim 24 wherein a derivative control response is generated to counteract rapid rates of change towards or away from the setpoint.

28. The method of claim 27 wherein a derivative control response is generated by determining a first effluent concentration prior to the reset time, a second effluent concentration is measured at the reset time, comparing the first effluent concentration to the second effluent concentration and adjusting the control response accordingly.

29. A method for automatic dose control of a liquid treatment chemical during a treatment process within a liquid treatment system using a feed chemical, the system having an influent flow and an effluent flow, the method comprising:

a. selecting a setpoint for a chemical in the effluent flow;

b. measuring the liquid flow rate through the treatment system and generating a liquid flow rate signal from the measurement;

c. measuring the concentration of the chemical of step (a) in the influent flow and generating an influent chemical concentration signal from the measurement;

d. measuring the concentration of the chemical of step (a) in the effluent flow and generating an effluent chemical concentration signal from the measurement;

e. transmitting the signal generated from step (b) to a chemical dosing controller and generating a primary control response;

f. adjusting the primary control response by a flow pace modifier;

g. transmitting the signal generated from step (c) to a chemical dosing controller and generating a secondary control response;

h. adjusting the secondary control response by an adjustable dose factor;

i. transmitting the signal from step (d) to the chemical dosing controller and calculating the difference between the effluent chemical concentration and the setpoint to generate a tertiary control response;

j. adjusting the tertiary control response by one or more sensitivity factors;

k. continuously calculating the dosage of the feed chemical from the primary control response and secondary control response while incorporating the tertiary control response from step (f) after a reset period;

l. transmitting an output signal from chemical dosing controller to a chemical feeding system, the output signal based on dosage calculated in step (k);

m. releasing a feed chemical into influent flow in response to output signal of step (l); and n. repeating steps (a)–(m) continuously during the treatment process.

30. The method of claim 29 wherein the chemical in step (a) is the same chemical as in step (m).

31. The method of claim 29 wherein the chemical in step (a) is a different chemical from the chemical in step (m).

32. The method of claim 29 wherein the reset time is input manually.

33. The method of claim 29 wherein the reset time is an automatically calculated variable based on the hydraulic residence time through the process and the process reaction time.

* * * * *

UNITED STATES PATENT AND TRADEMARK OFFICE
CERTIFICATE OF CORRECTION

PATENT NO : 6,129,104
DATED : October 10, 2000
INVENTOR(S): Gregory A. Ellard, Joseph M. Bonazza It is certified that error appears in the above-identified patent and that said Letters Patent are hereby corrected as shown below:

In item [75] the inventors should read "Gregory A. Ellard, Joseph M. Bonazza".
In Fig.1 should add 50 for chemical dosing controller. See attached drawing submitted May 9, 2000.
At col. 1, line 2, "chemicals. More" should read "chemicals, more".
At col. 3, line 29, "Alternatively, The" should read "Alternatively, the".
At col. 5, line 61, "step (m). 38. In" should read "step (m). In".
At col. 7, line 19, "will not be further describe" should read "will not be further described".
At col. 8, line 54, "response 1" should read "response is".
At col. 9, line 58, "Where" should read "where".
In Table Control Variables at col. 10, "Adjustably dose factor" should read "Adjustable dose factor".
At col. 11, line 58, "Operating" should read "operating".
At col. 11, line 61, "chemical. (2) Operating" should read "chemical; (2) operating".
At col. 15, line 22, "the of nitrite-nitrogen" should read "the nitrite-nitrogen".

Signed and Sealed this

Twenty-ninth Day of May, 2001

*Attest:*

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 6,129,104
DATED : October 10, 2000
INVENTOR(S) : Ellard et al.

It is certified that error appears in the above-identified patent and that said Letters Patent is hereby corrected as shown below:

<u>Title page,</u>
Item [54], Title, should read -- METHOD FOR AUTOMATIC DOSE CONTROL OF LIQUID TREATMENT CHEMICAL -- not "....AUTOMOTIVE DOSE CONTROL......"

Signed and Sealed this

Second Day of August, 2005

JON W. DUDAS
*Director of the United States Patent and Trademark Office*

(12) EX PARTE REEXAMINATION CERTIFICATE (6096th)
United States Patent
Ellard et al.

(10) Number: US 6,129,104 C1
(45) Certificate Issued: Jan. 15, 2008

(54) METHOD FOR AUTOMATIC DOSE CONTROL OF LIQUID TREATMENT CHEMICAL

(75) Inventors: Gregory A. Ellard, Tampa, FL (US); Joseph M. Bonazza, Tarenfum, PA (US)

(73) Assignee: Tetra Investment Holding, Co., Inc., Reno, NV (US)

Reexamination Request:
No. 90/006,889, Dec. 17, 2003

Reexamination Certificate for:
Patent No.: 6,129,104
Issued: Oct. 10, 2000
Appl. No.: 09/219,946
Filed: Dec. 23, 1998

Certificate of Correction issued May 29, 2001.

Certificate of Correction issued Aug. 2, 2005.

(51) Int. Cl.
*E03G 1/00* (2006.01)
*F17D 1/00* (2006.01)
*F17D 3/00* (2006.01)
*G05D 11/13* (2006.01)

(52) U.S. Cl. .................. 137/3; 137/9; 137/93
(58) Field of Classification Search ............ None
See application file for complete search history.

(56) References Cited

U.S. PATENT DOCUMENTS

| | | | | |
|---|---|---|---|---|
| 3,219,046 A | * | 11/1965 | Waugh ................. | 137/9 |
| 3,760,829 A | * | 9/1973 | Schuk et al. ........... | 137/93 |
| 4,060,097 A | * | 11/1977 | Oxford ................. | 137/93 |
| 4,337,786 A | * | 7/1982 | Myers et al. ........... | 137/3 |
| 4,544,489 A | * | 10/1985 | Campbell et al. ....... | 210/709 |
| 4,833,622 A | * | 5/1989 | Barto et al. ........... | 700/271 |
| 5,284,174 A | * | 2/1994 | Norman ............... | 137/93 |
| 5,308,491 A | * | 5/1994 | Hauck et al. .......... | 210/614 |
| 5,348,663 A | * | 9/1994 | Miers et al. ........... | 210/739 |
| 5,637,230 A | * | 6/1997 | Billings .............. | 210/739 |
| 5,779,911 A | * | 7/1998 | Haug et al. ........... | 210/739 |
| 5,855,791 A | | 1/1999 | Hays et al. | |

FOREIGN PATENT DOCUMENTS

| | | |
|---|---|---|
| DE | 0110111 A-1 | 10/1983 |
| DE | 0578032 A2 | 6/1993 |
| EP | 0071988 * | 8/1982 |
| EP | 0403296 * | 6/1990 |
| EP | 0787849 * | 1/1996 |
| JP | 52-93160 * | 5/1977 |
| JP | 60137494 A | 7/1985 |
| JP | 61249597 A | 11/1986 |
| ZA | 9 701 350 | 12/1997 |

OTHER PUBLICATIONS

"Classical Feedback/Feed Forward Central Applied to Methanol Dosing for Post–Dentrification" Anjou Re Cherche, 1013N998, no date given.*

"Nitrogen Control", publication No. EPA/625/R–93/010, United States Environmental Protection Agency, Sep. 1993, pp. 246 and 247.*

(Continued)

*Primary Examiner*—Aaron J. Lewis

(57) ABSTRACT

A method for controlling the addition of liquid treatment chemicals by automatic dose control. The calculation of the amount of chemical to be dosed into the system combines signals from a liquid flow meter, an influent chemical concentration analyzer and/or an effluent chemical concentration analyzer. The signals are directed to a computerized chemical dose controller that analyzes and adjusts the data from the signals and generates an output signal that controls the chemical dosing mechanisms. For example, the automatic dose control method encompasses the ability to set maximum positive and negative limits of control action as well as the ability to automatically or manually control the reset period necessary to allow previous changes to propagate through the system and be displayed at the effluent sensor thereby improving the dosing of the chemical during treatment of a liquid, wastewater for example.

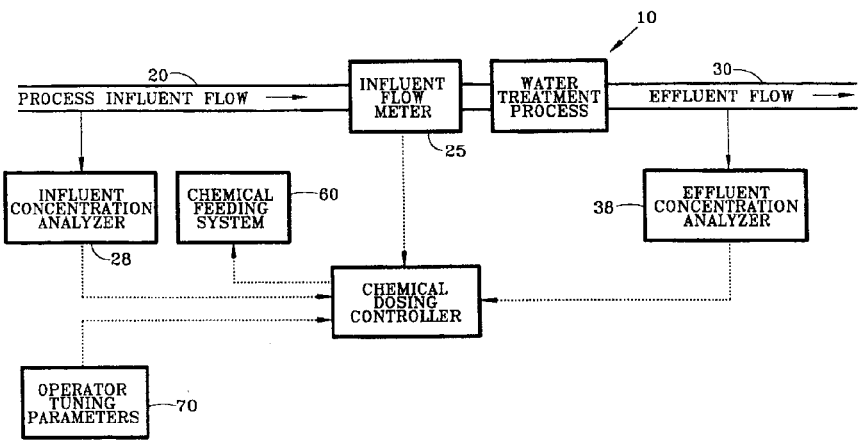

OTHER PUBLICATIONS

"Design Handbook for Automation of Activated Sludge Wastewater Treatment Plants", publication No. EPA–600/8–80–028, United States Environmental Protection Agency, Aug. 1980, pp. 6–96.*

English Translation of JP 60–137494 A (Enami et al.), translation date Aug. 2006 by FLS, Inc.*

English Translation of JP 60–1249597 A (Kimura et al.), translation date Aug. 2006 by Schreiber Translations, Inc..*

English Translation of EP 0 110 111 A1 (Gleisberg et al.), translation date Aug. 2006 by The Mcelroy Translation Company.*

English Translation of EP 0 578,032 A2 (Laurel et al.), translation date Aug. 2006 by FLS, Inc.*

Lindberg & Carlsson, Adaptive Control of External Carbon Flow Rate in an Activated Sludge Process, Water Science Technology, 1986, vol. 34, pp. 173–180, Elsevier Science Ltd., Great Britian.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–33 are cancelled.

* * * * *